(12) United States Patent
Mariotti

(10) Patent No.: US 9,397,383 B2
(45) Date of Patent: Jul. 19, 2016

(54) SYSTEM AND METHOD FOR MAST VIBRATION COMPENSATION

(75) Inventor: Marco Mariotti, Tortona (IT)

(73) Assignee: TELEFOLNAKTIEBOLAGET L M ERICSSON, Stockholm (SE)

(*) Notice: Subject to any disclaimer, the term of this patent is extended or adjusted under 35 U.S.C. 154(b) by 1008 days.

(21) Appl. No.: 12/994,269

(22) PCT Filed: May 23, 2008

(86) PCT No.: PCT/SE2008/000348
§ 371 (c)(1),
(2), (4) Date: Nov. 23, 2010

(87) PCT Pub. No.: WO2009/142554
PCT Pub. Date: Nov. 26, 2009

(65) Prior Publication Data
US 2011/0070855 A1  Mar. 24, 2011

(51) Int. Cl.
*H04M 1/00* (2006.01)
*H01Q 1/12* (2006.01)
*H04B 1/38* (2015.01)

(52) U.S. Cl.
CPC .................... *H01Q 1/1242* (2013.01)

(58) Field of Classification Search
CPC ........................................ H01Q 1/246
USPC .............. 455/25, 562.1; 342/368, 370–373; 343/757
See application file for complete search history.

(56) References Cited

U.S. PATENT DOCUMENTS

| | | | |
|---|---|---|---|
| 5,623,270 A | 4/1997 | Kempkes et al. | |
| 2006/0131414 A1* | 6/2006 | Nakaya et al. | 235/451 |
| 2007/0047560 A1* | 3/2007 | Tsai et al. | 370/401 |

* cited by examiner

*Primary Examiner* — Lee Nguyen
(74) *Attorney, Agent, or Firm* — Patents on Demand, P.A.; Brian K. Buchheit; Scott M. Garrett

(57) ABSTRACT

The present invention relates to a system for mast vibration compensation implemented in a communication system including a first node and a second node. The first node comprises a first adaptive antenna mounted in a mast; a receiver connected to said antenna; and a spatial and temporary processing system. The first adaptive antenna is controlled by a first correction signal generated in the spatial and temporary processing system. The correction signal is based on a parameter that indicates that a radio link alignment with a second node is degrading due to mechanical vibrations in the mast. The invention also relates to a method for mast vibration compensation.

14 Claims, 3 Drawing Sheets

SYSTEM AND METHOD FOR MAST VIBRATION COMPENSATION

TECHNICAL FIELD

The present invention relates to a system and a method for mast vibration compensation by adapting antenna beam direction and/or beam pattern, especially for compensating mast vibrations caused by external forces, such as wind.

BACKGROUND

In Microwave Radio Links, normally high gain parabolic antennas are used. This is a very common solution. Split outdoor units are very often mounted on masts that are part of the site installation. Each mast must have a very tough mechanical stability in order to allow the narrow beams of the high gain antennas to maintain aligned. This leads to higher costs for the mast, and for the installation, and to a higher degree of complexity for the site in general.

When Microwave Radio Transmission is used as technology for mobile backhaul, the costs and complexity of the mast where the Microwave Radios are mounted is becoming a limiting factor for the overall site cost. The requirement on the mechanical stability for the masts, where the Microwave Radios are fixed, is very tough and this is mainly due to the narrow-beam parabolic antennas used for this type of application. As a consequence each mast must be stable and stiff, which makes it bulky and expensive.

Thus there is a need to provide a system for backhaul radio links that requires less complexity in site installation in order to reduce costs.

SUMMARY OF THE INVENTION

An object with the present invention is to provide a system for providing backhaul radio links which is adapted to compensate for mast vibrations while maintaining acceptable communication requirements.

This object is achieved in a system provided with adaptive antennas with electronic beam shape, which are controlled in close loop in order to compensate the mechanical vibration of the mast.

An advantage with the present invention is that the requirement on the mast stability is greatly reduced compared to prior art systems.

Another advantage with the present invention is that the overall cost and complexity of the site is reduced in spite of the increased cost of the adaptive antenna as such.

Further objects and advantages may be found by a skilled person in the art from the detailed description.

BRIEF DESCRIPTION OF DRAWINGS

The invention will be described in connection with the following drawings that are provided as non-limited examples, in which.

ABBREVIATIONS

ATPC: Automatic Transmit Power Control
BW Beam Width
PTP Point to point
RSSI Received Signal Strength Indication

DETAILED DESCRIPTION

The proposed solution is to use adaptive antennas instead of the classical parabolic narrow-beam antennas and to reduce the requirement on the mast stability using the electronic control of the adaptive antenna to compensate the mechanical mast vibrations in a backhaul network, e.g. using microwave radio links.

Adaptive antennas with electronic beam shape control are commonly implemented in base stations to provide a suitable communication link between the base station and a user terminal, as described in U.S. Pat. No. 6,917,337 to Iida et al. Furthermore, adaptive antennas have also been used in point to point (PTP) communication systems to implement an interference mitigation method, as described in the published application US 2008/0049672 to Barak et al.

A typical half power beam-width angle for a classical high performance parabolic antenna is in the range 1° to 3° depending on frequency band and the dimensions of the antenna. This has a consequence that the antenna alignment requires a precision mechanical set, a robust fixing set and a robust mast. With antenna beam-width of 1° to 3°, the requirement on the mechanical fixing robustness becomes very tough, in the order of 0.5° of stability. This tough mechanical stability is required to cope with mechanical vibrations due to the environment (wind).

Figure 1:
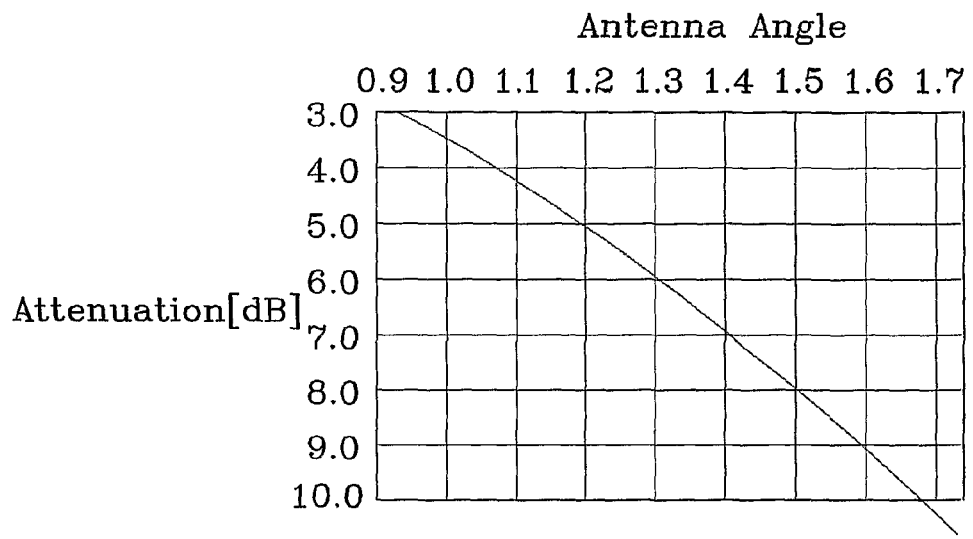
FIG. 1 shows a graph illustrating attenuation versus antenna misalignment in a prior art system using a parabolic antenna.

FIG. 1 illustrates (as an example) a graph for a parabolic antenna with a diameter D=0.6 m and a frequency f=23 GHz. 3 dB BW=0.92° 10 dB BW=1.68°

The illustrated attenuation as a function of beam width (Antenna angle) is very steep. Normally up to 10 dB of link budget (in each direction) is allowed to reduce the mechanical constraint of the mast structure. The attenuation of 6 to 20 dB of link budget due to antenna stability and shape is very high and corresponds to a very high cost for maintaining the PTP communication link.

As known, adaptive antennas are spatial processing systems, a combination of antenna arrays and sophisticated signal processing that allow adapting the effective radio pattern to the radio environment. Normally adaptive antennas are used to adapt the radio patterns to different users, to reduce interferences, to reduce effects due to scattering and multipath and to provide spatially selective transmit and receive patterns. Thus, the prior art use of adaptive antennas is to match radio link radio pattern and reduce interferences. The use of adaptive antennas in the prior art reduces cell to cell interferences and improves spectral efficiency reuse.

The present invention uses the benefits of the adaptive antennas to reduce the mechanical installation constraints and to reduce the requirement on the mast stability.

The system according to the invention comprises:
1. Adaptive antenna;
2. Transceiver;
3. Traffic and modulation system
4. A spatial and temporary processing system The spatial and temporary processing system includes the following sub-functions:

Measuring. To measure a proper parameter that indicates that the radio link alignment is degrading due to mechanical vibration in the mast (due to wind for instance);

Processing. To process information regarding the measured parameter in a loop in the radio link.

Correction. To correct the alignment of the antenna using the adaptive antenna signal processing The inventive algorithm may be implemented both in closed loop configuration in the complete radio link hop and in local loop configuration, preferably using the information on the Received Signal Strength Indication (RSSI).

Figure 2:
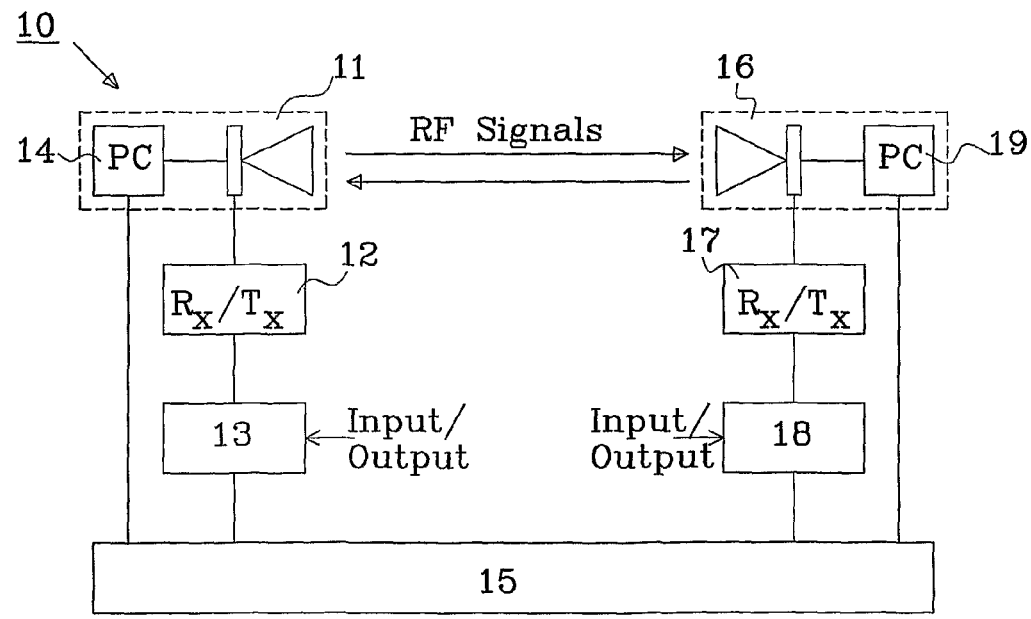
FIG. 2 shows a first embodiment of a system according to the present invention.

FIG. 2 shows a block diagram of a system 10 for mast vibration compensation in which an adaptive compensation algorithm is described with error detection in the far end terminal and a suitable error correction signal is sent back for the correction using the air interface. The system 10 comprises a first node and a second node that communicates with each other over a radio link using RF signals. The first node comprises a first adaptive antenna 11 with a phase control circuit 14 mounted in a mast (not shown), a first transceiver block 12, and a first traffic processing and modulation block 13. The second node comprises and a second adaptive antenna 16 with a phase control circuit 19 mounted in a mast (not shown), a second transceiver block 17, and a second traffic processing and modulation block 18. A spatial and temporary processing block 15 interconnects the first node and the second node by a wireless connection that is communicated through the same communication path as ordinary RF signals over the radio link.

Below follows a description of the function that each block performs:

Adaptive antenna (11, 16): communicates with an adaptive antenna belonging to another node using RF signals, and is provided with means to electrically control the beam forming by a control signal received from a beam control device. The antenna beam width control is obtained from a plurality of antenna elements forming the antenna directivity and a mechanism for correcting the antenna directivity in the direction in which the reception characteristics improves. The adaptive antenna includes variable phase shifters that control the basic elements of the antenna, a phase control circuit 14, 19 and a combining circuit that changes the phase of the basic elements as described in more detail in connection with FIG. 4.

A popular technology due to low cost used for adaptive antennas, especially at microwave frequencies, uses the microstrip patch antennas. With this technology the basic element consists of a metal patch suspended over a ground plane. A simple element can be half-wavelengths long patch where the electric field is in the direction of the current flow. A variation in the current feed results in the same variation of the radiated electric field.

By combining a number of basic elements with the proper phase in the electro magnetic field is possible to achieve high gain and directivity and adjust the beam width as desired. The number of basic elements depend on the total gain and bandwidth that has to be covered, and is a trade-off space/costs versus performance. As an example at 23 GHz, a basic element with dielectric constant of 2.4, dielectric height of 3 mm and size around 4 mm would give a radiation resistance of approximately 150 ohm and gain of 3-4 dB (depends also on the material loss). For the basic phase shift element different options and technologies are available at the state of the art. One possibility for microwave antennas is given by microstrip active phase shifter, including compact branch line couplers and reflecting wave varactor diodes.

Transceiver (12; 17): performs both transmission and receive functions using the state of the art of the radio frequency technology in order to transform the signal information into a radio frequency signal proper to be transferred into the air. This is obtained by the use of radio frequency amplifiers, frequency converters and RF filters matched efficiently with the antenna that performs the function to transform the electro magnetic field from radiated to conducted and vice versa, as is obvious for a skilled person.

Traffic processing and modulation (13; 18): performs the function to transform the information signal into a modulated signal that has high efficiency in term of information bit per Hz of bandwidth used. This block adds also the required signal processing and coding in order to improve the transmission in the air and to cope with the air channel.

Spatial and temporary processing (15): maximize the directivity in order to adaptively improve the received signal. When a reduction of the received signal due to antenna misalignment is detected, the processing block corrects accordingly the antenna beam by adjusting the phase of the basic elements via a phase control circuit 14; 19. The complete state of the adaptive antenna system can be described as a square matrix A of N×N elements, each one representing the current flow in the element itself as module and phase (it's a matrix of complex numbers). To control the beam pattern is not required to adjust N×N elements as the degree of freedom of the system is given by the eigenvalues of the matrix A, that has dimension N. If we consider the system as described by an N space, the state of the system can be represented by a vector in that space, as illustrated in FIG. 5.

Figure 5:
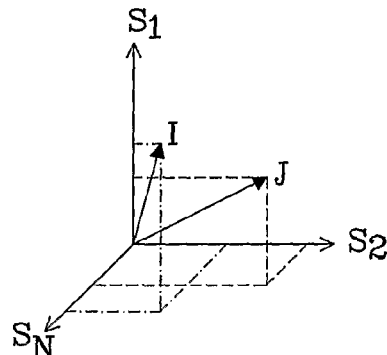
FIG. 5 shows a graphical presentation of the receive matrix and transmit matrix for the adaptive antenna in FIG. 4.

FIG. 5 shows a graphical example in case of a space of 3 dimensions (N=3) where I represents the received state of the antenna phase matrix and J represents the transmitted state of the antenna phase matrix. The property of all possible transitions of the antenna beam is described by the characteristic polynomial of the matrix A:

$$P(x) = \det(A - \lambda I)$$

Eigenvalues of the matrix A can be found by solving the equation: $(\lambda I - A) \ast x = 0$ The characteristic polynomial of the matrix A is a polynomial of N degree that has coefficients given by the eigenvalues of the matrix. A misalignment in the beam direction can be described by a variation in the distance of the two vectors representing the eigenvalues of the matrix A in the Tx side ($E_{TX}$) and Rx side ($E_{RX}$).

The processing block 15 calculates the eigenvalues of the Receiver Antenna Phase Matrix of one of the nodes, e.g. the first node, and receives from the other side of the radio link, e.g. the second node, the information of the Transmitted Antenna Phase Matrix. The spatial and temporary processing block 15 then calculates the vector distance between the two eigenvalues vectors and adjusts the direction of the Received beam in order to maximize the received signal indication value (RSSI). Thus, the N phase controls of the RX adaptive antenna are adjusted to maximize the following quantity:

$$d|E_{Rx} - E_{TX}| \rightarrow \text{MAX}_{RSSI}$$

The distance between the Rx control vector and far TX control vector represents the error vector signal that has to be minimized.

In addition to the above, it is also possible to implement a local error detection using the available indication of RSSI at the receiver side of the radio link. The possibility to ensure a proper error detection and correction is secured by the different fade rates that affect the main propagation effects in the microwave radio links:

Rain attenuation: typical fade rate is in the order of 20-50 dB/sec;

Atmospheric variation in the air: the fading rate is very slow, changes mainly with temperature.

Mast vibration effects: typical mechanical vibration effects give a fade rate in the order of hundreds of Hz.

Figure 6:
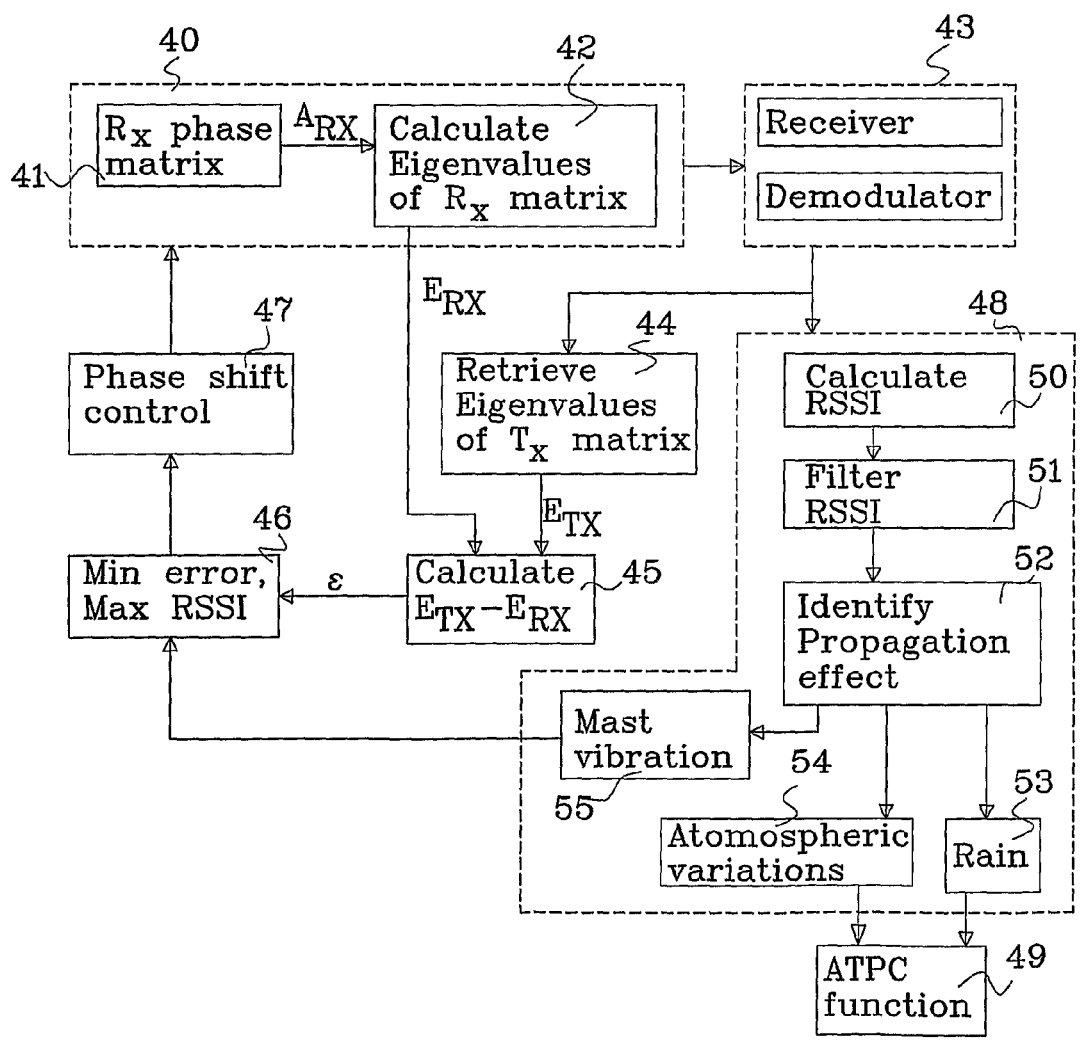
FIG. 6 illustrates a flow chart of the present invention.

A suitable method, as described in connection with FIG. 6, is used to detect which one of the above described propagation effects reduces the performance and increases the error. Thereafter, the proper error correction may be implemented. For the rain attenuation and atmospheric variation in the air, the error correction is normally given by an Automatic Transmit Power Control (ATPC) function that acts on the output power of the node. For mechanical vibration in the mast, the error correction could be an adjustment in the shape of the adaptive antenna beam-width, according to the invention. A proper filtering on variation rate of the RSSI signal indicates which propagation effects has to be compensated by the system (rain, atmospheric variation, mast vibration effects).

Figure 3:
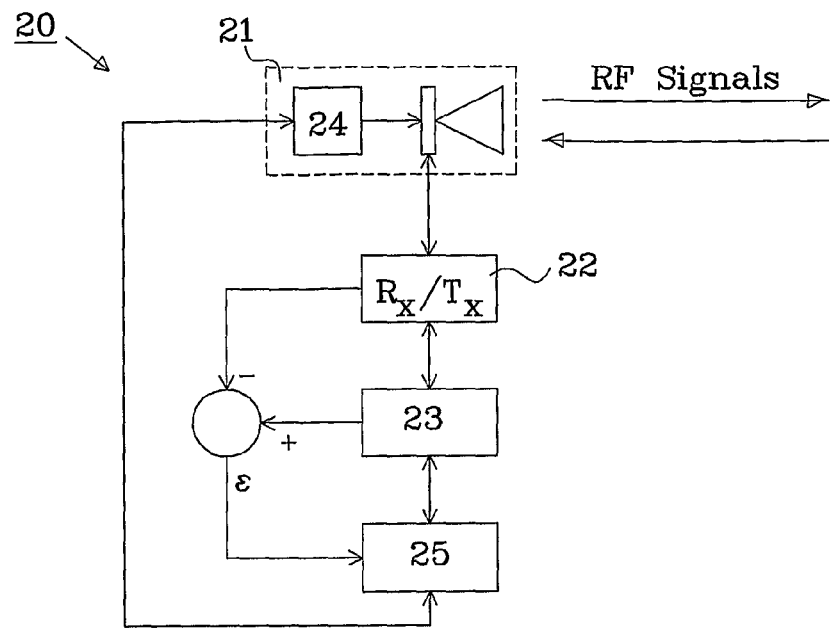
FIG. 3 shows a second embodiment of a system according to the present invention.

FIG. 3 shows an alternative embodiment of a block diagram of a system 20 for mast vibration compensation in which an adaptive compensation algorithm is described without error detection in a far end terminal and a suitable error correction signal is generated locally for the correction using the air interface. The system 20 comprises a node that communicates with another node over a radio link using RF signals. The node comprises an adaptive antenna 21 with a phase control circuit 24 mounted in a mast (not shown), a transceiver block 22, a traffic processing and modulation block 23 and a spatial and temporary processing block 25.

The eigenvalues of the receiving phase matrix are calculated and the spatial and temporary processing block adjusts the antenna elements of the RX beam ($E_{RX}$) in order to maximize the received signal.

$$|E_{Rx}| \rightarrow MAX_{RSSI}$$

The invention combines all the benefit of the adaptive antennas explained previously with the following new benefits:

Automatic electronic cancellation of the effects due to mechanical vibration into the mast, thanks to the adaptive antennas signal processing and a close loop algorithm that measures the reduction in performances in radio link due to antenna misalignment.

Reduction in the requirement of the mast mechanical stability.

Possibility to reduce the sensitivity to mechanical precision into all the installation mechanical.

Possibility to reduce the cost of the mechanical precision set used with the traditional parabolic antennas when fastening the antenna to the mast.

Figure 4:
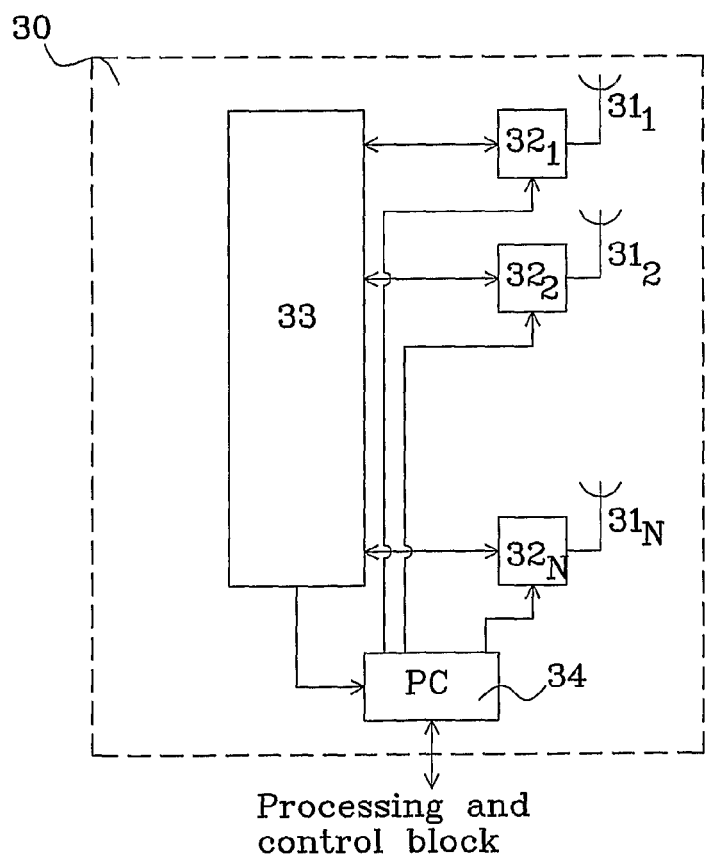
FIG. 4 shows an adaptive antenna used together with the present invention.

FIG. 4 illustrates an adaptive antenna 30 comprising N individual antenna elements $31_1$-$31_N$, each being controlled by a phase shifter $32_1$-$32_N$. A combiner 33 is connected with a phase control circuit 34 and each antenna element 31, via the phase shifters 32, which are controlled by the phase control circuit 34. The phase control circuit is connected to processing and control block as described in connection to FIGS. 2 and 3.

The method describing the operation of the system according to the invention is described in the FIG. 6.

A signal is received in an adaptive antenna 40, in which the receive phase matrix is measured in 41, and the resulting matrix $A_{RX}$ is transferred to 42 to calculate the eigenvalues of the receive phase matrix $E_{RX}$. The received signal is transferred to the receiver and demodulator (43) to generate RSSI of the signal.

If the eigenvalues of the transmit phase matrix $E_{TX}$ is available, 44, an error signal $\in$ is calculated by subtracting $E_{RX}$ from $E_{TX}$ in 45, i.e. the vector distance between the two eigenvalues vectors is calculated. The error signal is forwarded to 46 wherein the received signal indication value (RSSI) is maximized in order to minimize the error function. Instructions to adjust the phase shifters of the adaptive antenna 40 is generated in 47 based on the calculating performed in 46, and the adaptive antenna is thereafter adjusted. RSSI of the received signal is calculated in a RSSI processing unit 48, in which the calculated RSSI, 50, is filtered, 51, and the propagation effect is identified in 52 according to the following:

Rain (53): measure the fade rate and determine that the attenuation is caused by rain if it is in the order of 20-50 dB/sec;

Atmospheric variation (54): measure the fade rate and determine that the change in RSSI is caused by atmospheric variations if it is very slow, since it mainly changes with temperature.

Mast vibration effects (55): measure the fade rate and determine that the reduction in RSSI is caused by mechanical vibration id the reduction is in the order of hundreds of Hz.

If rain or atmospheric variations are determined to be the cause, Automatic Transmit Power Control (ATPC) function that acts on the output power of the node is activated, 49.

On the other hand if mast vibration is determined, the eigenvalues of the receive phase matrix $E_{RX}$ is adjusted in order to maximize the received signal strength indicator (RSSI) in 46.

The invention claimed is:

1. A system for mast vibration compensation implemented in a communication system comprising:
   a first node and a second node, wherein the first node comprises a first adaptive antenna;
   a receiver connected to the first adaptive antenna;
   a spatial and temporary processing system,
   wherein the first adaptive antenna is controlled by a first correction signal generated in the spatial and temporary processing system,
   wherein the first correction signal is based on a parameter indicating that a radio link alignment with the second node is degrading,
   wherein the parameter is obtained from the receiver in the first node, and
   wherein the system further comprises means to determine a fade rate of main propagation effects in order to ensure that the parameter indicates that the radio link alignment is degrading due to mechanical vibrations.

2. The system according to claim 1, wherein the determined fade rate is in the order of hundreds of Hz to indicate mechanical vibrations.

3. The system according to claim 1, wherein the first adaptive antenna is provided with means to calculate eigenvalues of a receive phase matrix $E_{RX}$, and a phase control circuit adapted to adjust an antenna beam in order to maximize the parameter based on the calculated eigenvalues $E_{RX}$.

4. The system according to claim 1, wherein the second node comprises a second adaptive antenna connected to a transmitter, wherein the transmitter is adapted to transmit a signal which is received by the receiver in the first node; and wherein the second adaptive antenna is controlled by a second correction signal generated in the spatial and temporary processing system shared by the first and second node.

5. The system according to claim 4, wherein the first adaptive antenna is provided with means to calculate eigenvalues of a receive phase matrix $E_{RX}$;

wherein the first node is provided with means to retrieve eigenvalues of a transmit phase matrix $E_{TX}$ of the second adaptive antenna, and wherein the first adaptive antenna further comprises a phase control circuit adapted to adjust an antenna beam in order to maximize the parameter based on the calculated eigenvalues of the receive phase matrix $E_{RX}$ and the retrieved eigenvalues of a transmit phase matrix $E_{TX}$.

6. The system according to claim 1, wherein the transmitter is implemented in a transceiver circuit.

7. The system according to claim 1, wherein the parameter is received signal strength indication (RSSI).

8. The system according to claim 1, wherein the receiver is implemented in a transceiver circuit.

9. A method for compensating for mast vibrations in a communication system, comprising:

measuring a parameter in a first node received by a first adaptive antenna, wherein the parameter indicates that a radio link alignment with a second node is degrading, and wherein the parameter is obtained from a receiver in the first node;

determining a fade rate of a main propagation effect in order to ensure that the measured parameter indicates that the radio link alignment is degrading due to mechanical vibrations;

generating a correction signal in a spatial and temporary processing system based on the measured parameter; and controlling the first adaptive antenna by the correction signal.

10. The method according to claim 9,
wherein the fade rate of the main propagation effect is determined before the correction signal is generated.

11. The method according to claim 9, further comprising:
calculating eigenvalues of a receive phase matrix $E_{RX}$, and,
adjusting an antenna beam in order to maximize the parameter based on the calculated eigenvalues $E_{RX}$.

12. The method according to claim 9, further comprising:
transmitting a signal from the second node which is received by the receiver, and
selecting the spatial and temporary processing system to be shared by the first and second node, wherein the generated correction signal is further based on the transmitted signal.

13. The method according to claim 12, further comprising:
calculating eigenvalues of a receive phase matrix $E_{RX}$,
retrieving, in the first node, eigenvalues of a transmit phase matrix $E_{TX}$ of the second adaptive antenna, and
adjusting an antenna beam in order to maximize the parameter based on the calculated eigenvalues of the receive phase matrix $E_{RX}$ and retrieved eigenvalues of the transmit phase matrix $E_{TX}$.

14. The method according to claim 9, further comprising selecting the parameter to be received signal strength indication (RSSS).

* * * * *